US006535495B1

(12) United States Patent
Moulsley

(10) Patent No.: US 6,535,495 B1
(45) Date of Patent: Mar. 18, 2003

(54) RADIO COMMUNICATION SYSTEM WITH MULTIPLE AND SIMULTANEOUS ENCODING TECHNIQUE

(75) Inventor: Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/421,644

(22) Filed: Oct. 20, 1999

(30) Foreign Application Priority Data

Oct. 29, 1998 (GB) .............................. 9823605

(51) Int. Cl.⁷ .............................. H04B 7/216
(52) U.S. Cl. ................ 370/335; 370/342; 375/130
(58) Field of Search .................. 370/335, 342, 370/328, 441; 375/130, 146; 455/517, 101

(56) References Cited

U.S. PATENT DOCUMENTS 4,965,826 A * 10/1990 Caprarese et al. ............ 380/19

5,533,014 A * 7/1996 Willars et al. ............... 370/335
5,539,746 A * 7/1996 Huang et al. ................ 370/462
5,828,956 A * 10/1998 Shirai ......................... 455/411

FOREIGN PATENT DOCUMENTS

WO       WO9429981        12/1994        ............ H04J/13/00

* cited by examiner

*Primary Examiner*—Vivian Chin
*Assistant Examiner*—Eliseo Ramos-Feliciano
(74) *Attorney, Agent, or Firm*—Dicran Halajian

(57) ABSTRACT

A method of operating a radio communication system uses a Code Division Multiple Access (CDMA) technique. Multiple scrambling codes may be used in a single cell to alleviate the shortage of channelisation codes available for downlink channels from a primary station. To minimise interference caused by the presence of non-orthogonal signals, signals to a single secondary station may be transmitted as a plurality of parts encoded with different scrambling codes.

11 Claims, 2 Drawing Sheets

RADIO COMMUNICATION SYSTEM WITH MULTIPLE AND SIMULTANEOUS ENCODING TECHNIQUE

FIELD OF THE INVENTION

The present invention relates to a method of operating a radio communication system, and further relates to such a system and to primary and secondary stations for use in such a system. While the present specification describes a system with particular reference to the emerging Universal Mobile Telecommunication System (UMTS), it is to be understood that such techniques are equally applicable to use in other mobile radio systems.

BACKGROUND OF THE INVENTION

A number communication systems, both existing and emerging, use Code Division Multiple Access (CDMA) techniques, one example being UMTS when operating in a wide band Code Division Multiple Access (CDMA) frequency division duplex mode. Such systems are typically cellular, with a Base Station (BS) servicing a plurality of Mobile Stations (MS) in a cell.

FIG. 1 is a block schematic diagram of a radio communication system using CDMA, comprising a primary station (BS) 100 and a plurality of secondary stations (MS) 110. The BS 100 comprises a microcontroller ($\mu$C) 102, transceiver means 104 connected to radio transmission means 106, and connection means 108 for connection to the PSTN or a private network. Each MS 110 comprises a microcontroller ($\mu$C) 112 and transceiver means 114 connected to radio transmission means 116. Communication from BS 100 to MS 110 takes place on a downlink channel 122, while communication from MS 110 to BS 100 takes place on an uplink channel 124.

FIG. 2 shows an example of a known arrangement for spreading and scrambling using Quadrature Phase Shift Keying (QPSK) modulation. Data is supplied on input line 202 to a serial to parallel converter 204, which maps each pair of data bits to I and Q branches respectively. A channelisation code 210 is supplied to mixers 206, 208 in the I and Q branches to spread the data to the chip rate. The data is then scrambled by a BS-specific scrambling code 216 supplied to I and Q mixers 212, 214. The resultant data is used to modulate a cosine carrier 220 by an I mixer 218, and a sine carrier 224 by a Q mixer 222. The I and Q branches are then combined by a combiner 226 before being passed to radio broadcast means 228 for transmission as a QPSK signal.

If a BS supports more than one cell (for example in a sectorised transmission arrangement), the scrambling code 216 could be cell-specific instead of BS-specific.

Different physical channels use different channelisation codes (usually orthogonal), while the scrambling code is the same for all physical channels in one cell.

On the downlink channel 122 a number of channelisation codes (usually orthogonal) are used to separate transmissions intended for different users, and an additional scrambling code is applied to distinguish the transmitting BS 100. Hence, to decode a message intended for it a MS 110 has to know both the code for the BS 100 sending the data and the code for its channel.

Similarly on the uplink channel 124 a channelisation code is used to select the channel on which the MS 110 is to transmit and a scrambling code, specific to the MS 110, is used.

A problem with this arrangement is the possible lack of channelisation codes for the downlink 122 since codes which have been allocated to one user, but are not currently in use, may not be available for another user. One possibility for relieving this shortage is to use more than one scrambling code per cell. However, this has the disadvantage that signals transmitted to one user with one scrambling code will not be orthogonal to signals transmitted to a different user with a different scrambling code, resulting in increased interference. SUMMARY OF THE INVENTION An object of the present invention is to reduce the problems caused by the use of more than one scrambling code in a cell.

According to a first aspect of the present invention there is provided a method of operating a radio communication system employing a code division multiple access technique, comprising a primary station transmitting data to a plurality of secondary stations, the primary station encoding different portions of said data with different scrambling codes, characterised by using a primary and a secondary scrambling code to encode data for transmission to a single secondary station.

According to a second aspect of the present invention there is provided a radio communication system employing a code division multiple access technique comprising a primary station and a plurality of secondary stations, the primary station having means for transmission of data to the secondary stations and means for encoding different portions of said data with different scrambling codes, characterised in that the primary station has means for using a primary and a secondary scrambling code to encode data for transmission to a single secondary station.

According to a third aspect of the present invention there is provided a primary station for use in a radio communication system employing a code division multiple access technique, the primary station having means for transmission of data to the secondary stations and means for encoding different portions of said data with different scrambling codes, characterised in that the primary station has means for using a primary and a secondary scrambling code to encode data for transmission to a single secondary station.

According to a fourth aspect of the present invention there is provided a secondary station for use in a radio communication system employing a code division multiple access technique, characterised in that the secondary station has means for receiving data from a single primary station encoded using a primary and a secondary scrambling code.

The present invention is based on the recognition, not present in the prior art, that a plurality of scrambling codes can be allocated for transmissions from one BS to a single MS.

BRIEF DESCRIPTION OF THE DRAWING

Embodiments of the present invention will now be described, by way of example, with reference to the accompanying drawings, wherein.

In the drawings the same reference numerals have been used to indicate corresponding features.

DETAILED DESCRIPTION OF THE INVENTION

Figure 1:
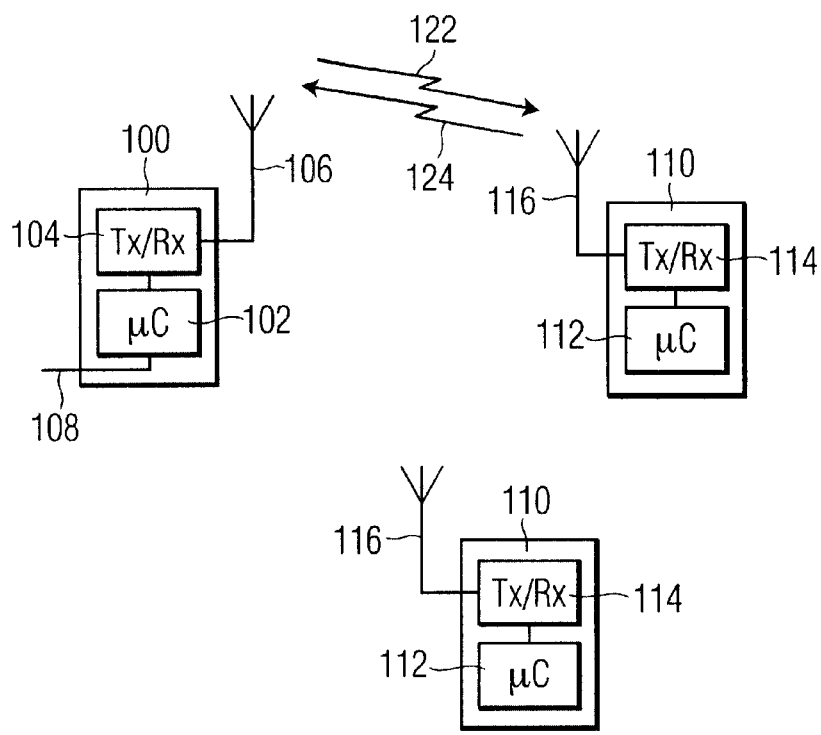
FIG. 1 is a block schematic diagram of a radio communication system, as described above.
Figure 2:
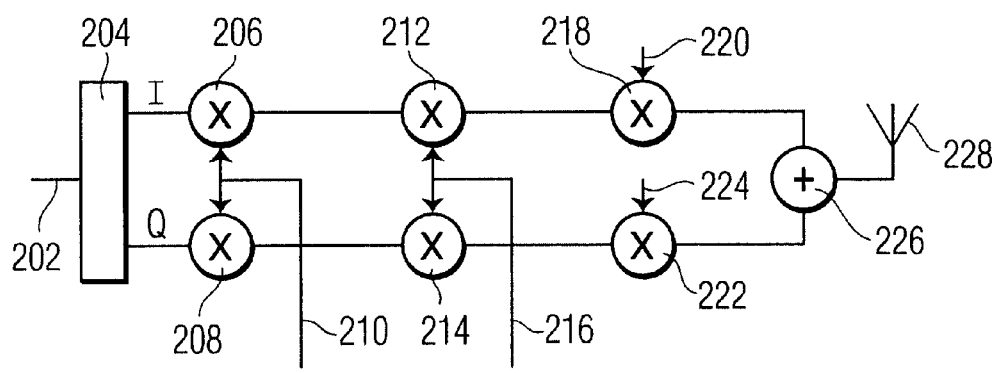
FIG. 2 is a block schematic diagram of part of a transmitter, as described above.
Figure 3:
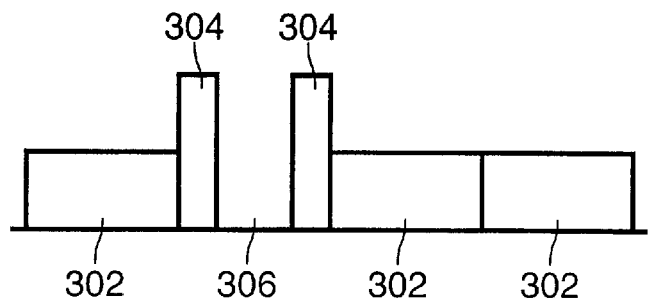
FIG. 3 illustrates a downlink slotted mode using a secondary scrambling code.

A first illustrative embodiment of the present invention is the implementation of downlink slotted mode shown in FIG. 3. Slotted mode is required in order to introduce gaps in the transmission during which the MS 110, which may have only one receiver, can make measurements on other carriers, for example to prepare for handover. A succession of frames 302 is transmitted on a downlink channel 122, each of length 10 ms in UMTS. In one frame the data is transmitted during two active parts 304 of the frame, the remainder of the frame being an idle period 306 during which the required measurements can be made.

The consequence of this is that the bit rate and transmission power both need to be increased during the active part of the frame. The bit rate can be increased by reducing the spreading factor (for example by a factor of two for the 50% idle period 306 illustrated). However, this requires the allocation of another channelisation code, that is the provision of a second channel for the MS 110. This is an inefficient use of codes, since the extra resource is only required during the slotted frame.

One option in accordance with the present invention, as illustrated in FIG. 3, is to use a primary scrambling code for all the non-slotted frames 302, while using a secondary scrambling code for the slotted frame 304.

Figure 4:
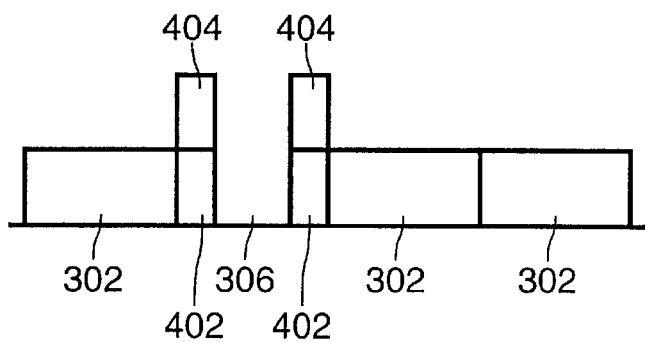
FIG. 4 illustrates a downlink slotted mode using primary and secondary scrambling codes.

A preferred option is illustrated in FIG. 4. Here a first part 402 of the active part of the slotted frame is transmitted using the primary scrambling code, while a second part 404 of the slotted frame is transmitted using the secondary scrambling code. This alternative has the advantage of minimising the amount of "non-orthogonal" energy transmitted.

In general, for any transmission scheme using two or more scrambling codes for one MS 110 it is preferable to designate one code as the primary code and to transmit as much data as possible using this code (thereby maximising the power transmitted using this code), while minimising the power transmitted using the secondary codes. Hence the secondary code should be used to carry traffic with a low average data rate (which includes a high data rate with a low duty cycle, as in the slotted mode example).

Figure 5:
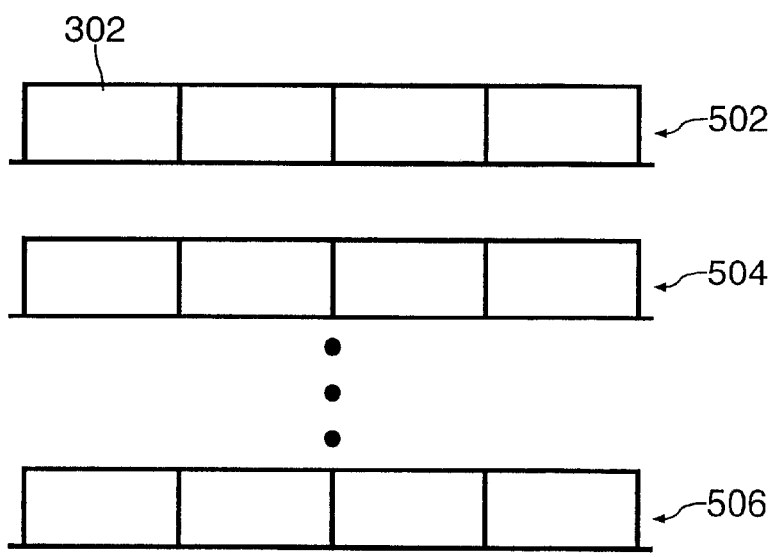
FIG. 5 illustrates a variable rate multicode transmission using primary and secondary scrambling codes.

A second illustrative embodiment of the present invention is the implementation of variable rate multi-code transmissions shown in FIG. 5. When the required bit rate exceeds what is possible with a single channelisation code, multiple codes can be used, corresponding to multiple physical channels. The figure shows a first physical channel 502, comprising a succession of frames 302, a second physical channel 504 and an nth physical channel 506.

For any particular instantaneous data rate, the data can be organised to minimise the number of codes used, allocating some of the least used channelisation codes to the secondary scrambling code. For example, in FIG. 5 the first and second channels 502, 504 could be transmitted using the primary scrambling code, while the nth channel 506 could be transmitted using the secondary scrambling code. In general as many channels as possible should be transmitted using the primary scrambling code, consistent with efficient use of channelisation codes.

Use of this scheme will save channelisation codes while minimising the resulting interference.

Other possible uses for secondary scrambling codes are packet transmissions, rare but urgent signalling (for example packet acknowledgements), and uplink power control where there is little or no downlink data.

From reading the present disclosure, other modifications will be apparent to persons skilled in the art. Such modifications may involve other features which are already known in radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

What is claimed is:

1. A method of operating a radio communication system employing a code division multiple access technique, comprising a primary station transmitting data to a plurality of secondary stations, the primary station encoding different portions of said data with different scrambling codes, using a primary scrambling code and a secondary scrambling code to encode data for transmission to a secondary station, and transmitting a slotted mode signal to the secondary station using a primary scrambling code for a first portion of the data and a secondary scrambling code for the remainder of the data, both portions being transmitted contemporaneously.

2. A method as claimed in claim 1, wherein the majority of the data transmitted by the primary station is encoded with the primary scrambling code and the remainder of the data being encoded with the secondary scrambling code.

3. A method as claimed in claim 1, wherein the primary station transmits a slotted mode signal to the secondary station using the secondary scrambling code.

4. A method as claimed in claim 1, wherein the primary station transmits a multi-code signal comprising a plurality of channels to the secondary station using the primary scrambling code for a first portion of the channels and the secondary scrambling code for the remainder of the channels.

5. A radio communication system employing a code division multiple access technique comprising a primary station and a plurality of secondary stations, the primary station having means for transmission of data to the secondary stations and means for encoding different portions of said data with different scrambling codes, means for using a primary scrambling code and a secondary scrambling code to encode data for transmission to a secondary station, and means for transmitting a slotted mode signal to the secondary station using the primary scrambling code for a first portion of the data and the secondary scrambling code for the remainder of the data, both portions being transmitted contemporaneously.

6. A primary station for use in a radio communication system employing a code division multiple access technique, the primary station having means for transmission of data to the secondary stations and means for encoding different portions of said data with different scrambling codes, means for using a primary scrambling code and a secondary scrambling code to encode data for transmission to a secondary station, and means for transmitting a slotted mode signal to the secondary station using the primary scrambling code for a first portion of the data and the secondary scrambling code for the remainder of the data, both portions being transmitted contemporaneously.

7. A primary station as claimed in claim 6, further comprising means for transmitting the majority of the data encoded with the primary scrambling code and the remainder of the data encoded with the secondary scrambling code.

8. A primary station as claimed in claim 6, further comprising means for transmitting a slotted mode signal to the secondary station using the secondary scrambling code.

9. A primary station as claimed in claim 6, further comprising means for transmitting a multi-code signal comprising a plurality of channels to a secondary station using the primary scrambling code for a first portion of the channels and the secondary scrambling code for the remainder of the channels.

10. A secondary station for use in a radio communication system employing a code division multiple access technique, the secondary station comprising means for receiving data from a single primary station encoded using a primary scrambling code and a secondary scrambling code, wherein said data includes a slotted mode signal having a first portion encoded with the primary scrambling code and a second portion encoded with the secondary scrambling code, both portions being transmitted contemporaneously.

11. A communication station comprising:
- a transmitter for transmitting transmit data to a terminal; and
- a receiver for receiving receive data from said terminal;
- wherein one of said transmit data and receive data has a first portion and a second portion, said first portion being encoded with a primary scrambling code and said second portion being encoded with a secondary scrambling code; and
- wherein said communication station is configured to one of transmit and receive both said first portion and said second portion contemporaneously.

* * * * *